Sept. 9, 1952  L. S. IRWIN  2,609,960
SKILLET COVER
Filed Sept. 9, 1949
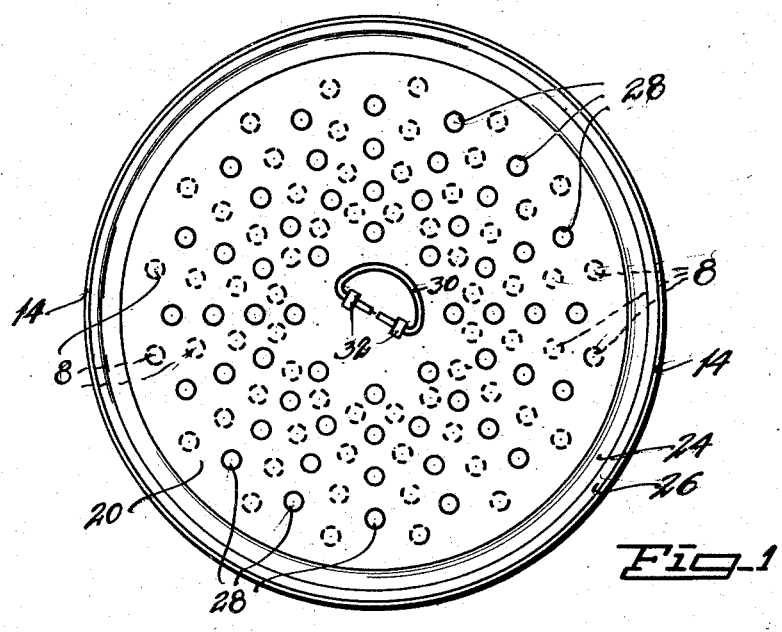
Fig_1
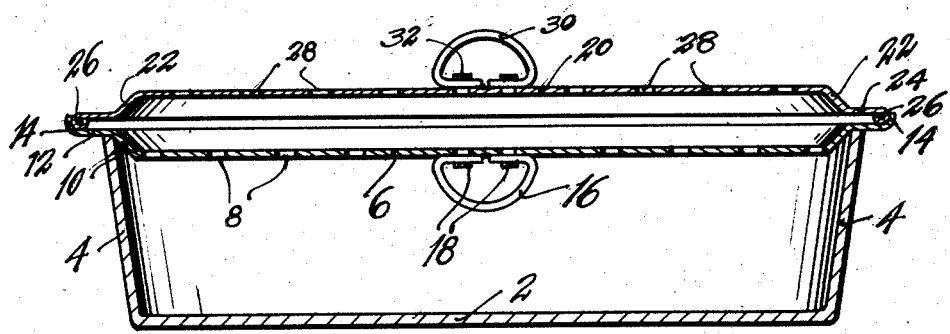
Fig_2
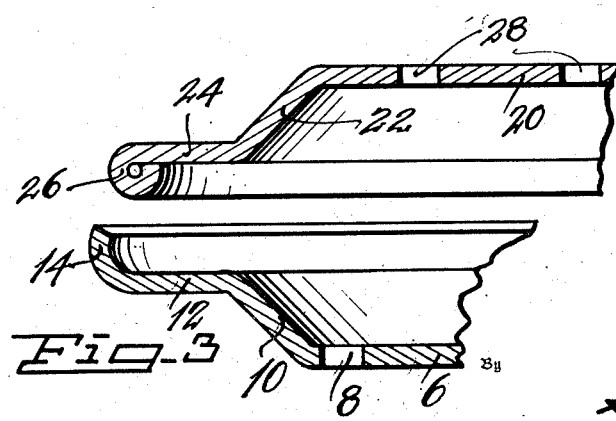
Fig_3
Inventor
Leland S. Irwin
By Glenn L. Fish
Attorney Patented Sept. 9, 1952

2,609,960

UNITED STATES PATENT OFFICE 2,609,960

SKILLET COVER

Leland S. Irwin, Ritzville, Wash.

Application September 9, 1949, Serial No. 114,715

1 Claim. (Cl. 220—44)

My present invention relates to an improved skillet cover of the type comprising a pair of spaced perforated cover sections with the perforations so arranged that no perforation of the upper and lower sections are aligned thereby allowing ventilation of the pan but preventing splashing grease from passing through the cover.

The sections are formed so that for storage the upper section will nest into the lower section for convenient saving of space.

In the accompanying drawings I have illustrated one complete example of the physical embodiment of my invention according to the best mode I have thus far devised, but it will be understood that various changes and alterations may be made in the exemplified structure within the scope of the appended claim.

In the drawings:

Fig. 1 is a top plan view of the skillet cover of my invention.

Fig. 2 is a vertical sectional view thereof showing the conventional frying pan.

Fig. 3 is an enlarged partial sectional view of the sections showing the structure whereby the rims coact.

Referring now to the drawings wherein I have illustrated the present preferred embodiment of my invention, I have shown a skillet or frying pan 2 having a sloping wall 4. The cover of my invention is designed for support upon the upper rim of the wall.

The lower section of the cover comprises a disk 6 perforated at 8 in radially spaced, concentric circles, and a shoulder 10 is fashioned in the disk to form the offset edge 12 which is curled at 14 to form an annular lip about the rim of the disk 6.

A wire handle 16 is secured pivotally at 18 to the center of the disk and as seen, the shoulder of the disk fits neatly into the wall of the skillet with the section inverted.

The upper section consists in a disk 20 having a shoulder 22 forming offset 24 and the edge of the offset is curled into a bead 26 to fit into the lip 14. This disk is slightly smaller in diameter than the lower section disk so that the upper section will nest into the lower for storage.

The upper disk is also perforated as at 28 in radially spaced concentric circles but the circles of perforations of the upper disk are arranged vertically intermediate the spaced circles of perforations of the lower disk so that no opening of the upper disk can be aligned with an opening of the lower disk. Thus splattering grease may pass through the lower section but will hardly traverse the angular route to pass through the upper section. Ventilation is therefore provided without the danger of the cook being burned.

The upper section has a handle 30 pivotally secured as at 32, and when in position as shown, a slight pull on handle 30 will release the bead 26 from lip 14.

Having thus fully described my invention what I claim as new and desire to secure by Letters Patent is:

A skillet cover comprising a perforated lower disc having its marginal portions bent to form an upwardly extending annular flared shoulder and a circumferentially extending outstanding lip carried by and surrounding said shoulder, the lip being bordered by an upwardly projecting flange arcuate in cross section, an upper perforated disc having its marginal portions bent to form a downwardly extending annular flared shoulder of the same diameter as the shoulder of the lower disc and a circumferentially extending outstanding lip carried by its shoulder corresponding in diameter to the lip of the lower disc and bordered by a downwardly extending marginal bead circular in cross section, the bead of said upper disc resting upon the lip of the lower disc with the flange of the lower disc fitting closely about the bead and tightly gripping said bead and thereby detachably holding said upper disc in position above the lower disc in spaced relation thereto, the perforations of said discs being disposed out of alignment with each other, and handles carried by said discs centrally thereof and pivotally mounted for movement from an extended position for use to a folder position flat against the discs.

LELAND S. IRWIN.

REFERENCES CITED

The following references are of record in the file of this patent:

UNITED STATES PATENTS

| Number | Name | Date |
|---|---|---|
| 171,200 | Wachs | Dec. 14, 1875 |
| 397,869 | Munson | Feb. 12, 1889 |
| 626,808 | Gurney | June 13, 1899 |
| 1,470,521 | Combest | Oct. 9, 1923 |
| 1,616,050 | Kania | Feb. 1, 1927 |
| 1,678,516 | Juengst | July 24, 1928 |
| 2,170,738 | Thompson | Aug. 22, 1939 |

FOREIGN PATENTS

| Number | Country | Date |
|---|---|---|
| 16,627 | Great Britain | of 1915 |